(12) United States Patent
Park et al.

(10) Patent No.: US 7,531,272 B2
(45) Date of Patent: May 12, 2009

(54) CARBOXYMETHYL CELLULOSE-BASED BINDER MATERIAL AND LITHIUM BATTERY USING THE SAME

(75) Inventors: Jin-Hwan Park, Seoul (KR); Seung-Sik Hwang, Seongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 653 days.

(21) Appl. No.: 10/948,679

(22) Filed: Sep. 24, 2004

(65) Prior Publication Data

US 2005/0074669 A1 Apr. 7, 2005

(30) Foreign Application Priority Data

Oct. 1, 2003 (KR) ........................ 10-2003-0068327

(51) Int. Cl.
*H01M 4/62* (2006.01)
*C08F 251/00* (2006.01)
(52) U.S. Cl. ........................ 429/217; 527/300
(58) Field of Classification Search ............... 429/217; 527/300
See application file for complete search history.

(56) References Cited

U.S. PATENT DOCUMENTS

| 5,501,548 | A | 3/1996 | Hayashi et al. | |
| 5,635,151 | A | 6/1997 | Zhang et al. | |
| 5,837,015 | A | 11/1998 | Venugopal et al. | |
| 6,656,633 | B2 * | 12/2003 | Yamakawa et al. | 429/217 |
| 6,800,222 | B1 * | 10/2004 | Noguchi et al. | 252/502 |

FOREIGN PATENT DOCUMENTS

| JP | 61103969 | 5/1986 |
| JP | 62157560 | 7/1987 |
| JP | 4255760 | 9/1992 |
| JP | 574461 | 3/1993 |
| JP | 10154513 | 6/1998 |
| JP | 1167213 | 3/1999 |
| JP | 200233105 | 1/2002 |

OTHER PUBLICATIONS

Peter Kauper, et al; Development and evaluation of methods for determining the pattern of functionalization in sodium carboxymethylcelluloses; Die Angewandte Makromolekulare Chemie 260 (1998) pp. 53-63 (Nr. 4751).
Chinese Office Action dated Mar. 7, 2008.

* cited by examiner

*Primary Examiner*—Patrick Ryan
*Assistant Examiner*—Karie O'Neill
(74) *Attorney, Agent, or Firm*—H.C. Park & Associates, PLC

(57) ABSTRACT

The present invention is related to compositions and methods for producing a lithium battery with enhanced performance. In particular, the present invention is directed to increasing the solubility of a carboxymethyl cellulose-based binder in water. When the solubility of the carboxymethyl cellulose-based binder is improved, the electrode manufacturing process may be stabilized, and the dispersibility and adhesive force of the electrode may also be improved. As a result, a lithium battery with excellent characteristics may be manufactured. Additionally, the present invention is also directed to an environmentally-friendly manufacturing process for fabricating an anode whereby water is used as the slurry medium, and a lithium battery containing the anode.

4 Claims, 2 Drawing Sheets

CARBOXYMETHYL CELLULOSE-BASED BINDER MATERIAL AND LITHIUM BATTERY USING THE SAME

CROSS-REFERENCE TO RELATED APPLICATIONS

This application claims priority to Korean Patent Application No. 2003-68327, filed on Oct. 1, 2003, in the Korean Intellectual Property Office, the disclosure of which is incorporated herein in its entirety by reference.

FIELD OF THE INVENTION

The present invention is related to compositions and methods for producing a lithium battery with enhanced performance. In particular, the present invention is directed to increasing the solubility of a carboxymethyl cellulose-based binder in water. Additionally, the present invention is also directed to an environmentally-friendly manufacturing process for fabricating an anode whereby water is used as the slurry medium and a lithium battery containing the anode.

BACKGROUND

As the demand for portable electronic devices such as personal digital assistants (PDAs), mobile phones, and notebook computers increases, so does the demand for portable devices having a more compact, thinner, and lightweight design. Accordingly, batteries providing power to those devices are regarded as an important component of such devices. In particular, lithium batteries have been used as major power sources for such portable devices because they are lightweight and have higher energy density.

Lithium batteries are comprised of, inter alia, cathode active materials and anode active materials. For example, U.S. Pat. Nos. 5,837,015, 5,635,151, and 5,501,548 disclose cathode active materials and anode active materials that may be used for lithium batteries. Cathode active materials for lithium batteries may be composed of Li-containing transition metal oxides, such as $LiCoO_2$ and $LiNiO_2$, and chalcogen compounds, such as $MoS_2$. Since these compounds have a layer-like crystalline structure, Li ions can be reversibly intercalated or deintercalated into the structure. Accordingly, these compounds have been widely utilized as cathode active materials for lithium batteries. If, however, an anode active material comprises metal lithium which intercalates and deintercalates lithium ions, needle-shaped lithium dendrites grow on the surface of lithium. This occurs because the lithium repeatedly dissolves and precipitates during charging/discharging of the battery. As a result, the needle-shaped dendrites decrease charge/discharge efficiency, and cause internal short-circuits by contacting a cathode.

In order to overcome these problems, a material which reversibly intercalates and deintercalates lithium ions may be used as the anode material. This material may be lithium alloy, metal powder, graphitic or carbonaceous materials, metal oxides, or metal sulfides. When the sheet-type anode composed of a lithium alloy is used in a battery, however, the sheet-type alloy becomes thinner during charging/discharging As a consequence, the charge/discharge cycle characteristics of the battery deteriorate.

A binder is required when the sheet-type electrode is composed of metal powder, a carbonaceous material powder, a metal oxide powder, or metal sulfide powder, because these materials in powder form cannot form electrodes alone. For an example, Japanese Patent Laid-open Publication No. JP 4-255760 discloses a method of forming an anode using a carbonaceous material powder as binder, such as an elastic rubber-based polymer binder. A conductor is used in addition to the binder when the anode is composed of a metal oxide powder or a metal sulfide powder in order to improve the charge/discharge characteristics of the battery.

Additionally, lithium battery anodes also have been manufactured using an organic solvent containing N-methyl-2-pyrrolidone (NMP), but this compound is extremely toxic to humans and the environment. As a result, the manufacturing process is complex and requires more equipment in many processes. In order to overcome these problems, Japanese Patent Laid-open Publication No. JP 5-74461 discloses a method of forming an aqueous anode active material slurry using a styrene butadiene rubber (SBR)-based binder and a carboxymethyl cellulose-based binder. In this case, water is used as the solvent.

The performance of a lithium battery anode may be enhanced by improving the characteristics of the carboxymethyl cellulose-based binder. Such an improvement may be accomplished by adjusting the degree of etherification or polymerization of the carboxymethyl cellulose-based binder. The average degree of polymerization determines the viscosity characteristics of slurry. The degree of etherification indicates the number of hydroxyl groups which are capable of being substituted with a carboxymethyl group, but are actually substituted with carboxymethyl groups. For example, Japanese Patent Laid-open Publication No. JP11-67123 discloses a method of forming an aqueous anode active material slurry using a carboxymethyl cellulose-based binder which has a degree of etherification in a range of 0.5-1 and an average degree of polymerization in a range of 300-1,800. Moreover, Japanese Patent Laid-open Publication No. 2002-33105 discloses a method of forming an aqueous anode active material slurry using a carboxymethyl cellulose-based binder which has an average degree of polymerization in a range of 1,500 to 3,000 and where the product of the average degree of polymerization and the degree of etherification is in a range of 750-2,000.

Alternatively, the lithium battery anode may be improved by using a combination of a carboxymethyl cellulose-based binder and a SBR-based material to form the anode active material slurry. In general, a carboxymethyl-cellulose aqueous solution is prepared by dissolving the water-soluble carboxymethyl cellulose-based binder, subsequently the SBR-based material and an anode active material are added to the carboxymethyl cellulose aqueous solution and mixed to form the slurry. In this process, however, needle-shaped materials that are non-soluble in water are generated. The needle-shaped materials reside in the anode active material slurry which can amalgamate the electrode materials or can weaken the dispersibility of the slurry. Consequently, the adhesive force of the anode becomes weak, resulting in a lithium battery which exhibits a poor cycle life performance.

While much research on a conventional carboxymethyl cellulose-based binder has been focused on the average degree of polymerization and the average of etherification, little efforts have been directed to increasing the water solubility of the carboxymethyl cellulose-based binder to improve the dispersibility of the slurry and adhesive force of an anode, in order to attain a high performance lithium battery.

SUMMARY OF THE INVENTION

The present invention is directed to a carboxymethyl cellulose-based binder for a lithium battery. The carboxymethyl cellulose-based binder of the present invention exhibits improved water solubility. Moreover, an anode slurry containing the carboxymethyl cellulose-based binder exhibits improved dispersibility and strong adhesive force.

According to an aspect of the present invention, a lithium battery anode containing a carboxymethyl cellulose-based binder is contemplated. Furthermore, the present invention is directed to a lithium battery containing the lithium battery anode. In a particular aspect, the carboxymethyl cellulose-based binder used in a lithium battery comprises substituted and unsubstituted glucose units. In a specific aspect, the glucose units are substituted with a carboxymethyl group following hydrolysis. In a further aspect, the carboxymethyl cellulose-based binder has less than 12% of unsubstituted glucose units.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

The present invention contemplates improving the electric characteristics of a lithium battery anode and a lithium battery using the same. In particular, the present invention is directed to increasing the solubility of a carboxymethyl cellulose-based binder in water. When the solubility of the carboxymethyl cellulose-based binder is improved, the electrode manufacturing process may be stabilized, and the dispersibility and adhesive force of the electrode may also be improved. As a result, a lithium battery with excellent characteristics may be manufactured. Therefore, the present invention is also directed to an environmentally-friendly manufacturing process for fabricating an anode whereby water is used as the slurry medium, and a lithium battery containing the anode.

In one embodiment of the present invention, a lithium battery anode is manufactured using anode forming materials. Specifically, the anode forming materials may contain an anode active material, which includes, but is not limited to, a carbonaceous material, a SBR-based binder, and a carboxymethyl cellulose-based binder. A carboxymethyl cellulose-based binder may be used as the binder for the lithium battery anode. The carboxymethyl cellulose-based binder may have substituted and unsubstituted glucose units. Specifically, the carboxymethyl cellulose-based binder may have glucose units that are substituted with a carboxymethyl group following hydrolysis. In a further embodiment, the carboxymethyl cellulose-based binder may have less than 12% of unsubstituted glucose units.

In another embodiment, the carboxymethyl cellulose-based binder may be added to an anode active material. In particular, the carboxymethyl cellulose-based binder may be substituted with a $Na^+$ salt or a $NH_4$ salt. An exemplary embodiment of a carboxymethyl cellulose-based binder substituted with a Na salt is represented by Formula 1 below:

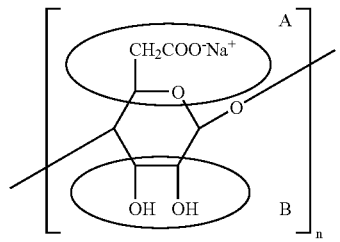

With respect to Formula 1, a structure of the carboxymethyl cellulose-based binder is shown where A is a hydrophilic binding site capable of binding with water, and B is a lipophilic binding site capable of binding with a carbonaceous material. The presence of the hydrophilic binding site that is substituted with a carboxymethyl group may increase the water solubility of the binder.

Figure 2:
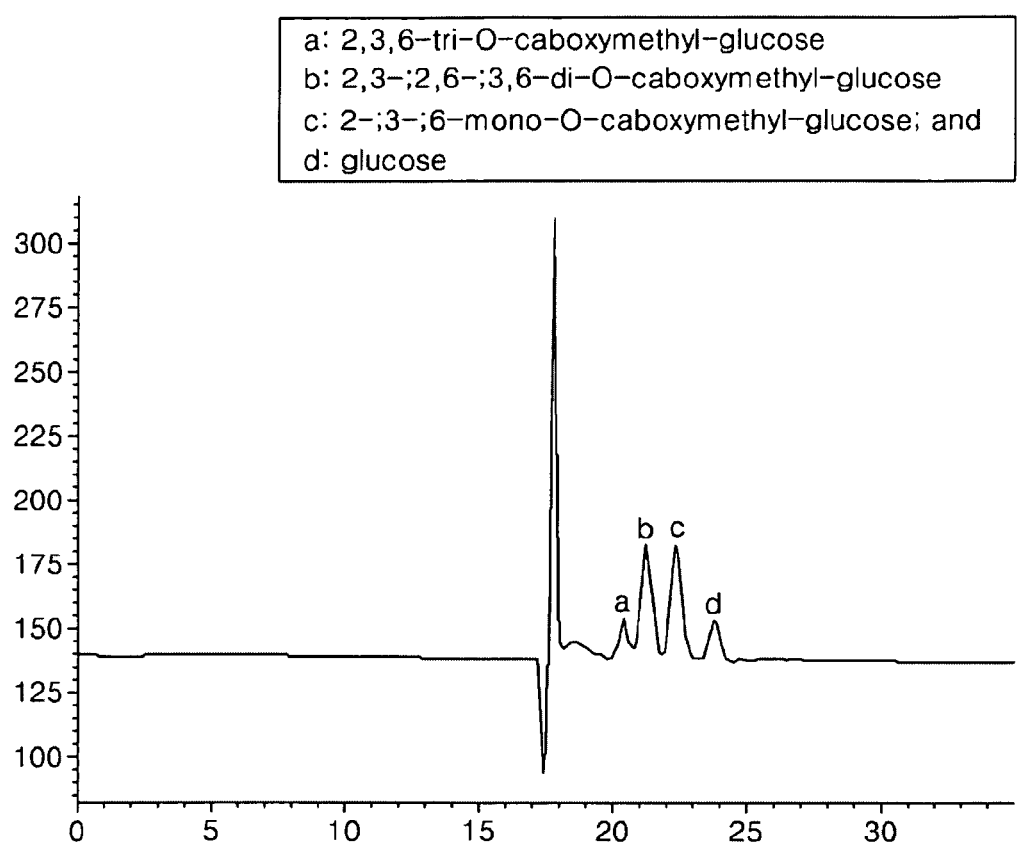
FIG. 2 depicts an HPLC chromatogram of a hydrolyzed Na-carboxymethyl cellulose-based compound.

The water solubility of the carboxymethyl cellulose-based binder may depend upon the amount of glucose units that are not substituted with a carboxymethyl group. In order to measure the amount of unsubstituted glucose units, the carboxymethyl cellulose-based binder may be hydrolyzed, and then may be analyzed using High Performance Liquid Chromatography (HPLC). For example, Angewandte chemie (1998) 53-58 discloses a method for determining content ratios of four different products, which are distinguished from one another by the number of hydroxyl groups (—OH) substituted with carboxymethyl groups. The method includes hydrolyzing Na-carboxymethyl cellulose-based compounds and analyzing the hydrolyzed compound using the HPLC chromatogram. Referring to FIG. 2, the lettered peaks of a, b, c and d are as follows:

a: 2,3,6-tri-O-carboxymethyl-glucose;
b: 2,3-; 2,6-; 3,6-di-O-carboxymethyl-glucose;
c: 2-; 3-; 6-mono-O-carboxymethyl-glucose; and
d: glucose.

The amount of glucose units (d), in which no hydroxyl groups at positions 2, 3 and 6 are substituted with a carboxymethyl group, may be determined by calculating the content ratio of a, b, c and d. If the content ratio of glucose units that do not undergo carboxymethylation decreases, the water solubility of the carboxymethyl cellulose-based binder increases. Therefore, the utilization of a carboxymethyl cellulose-based binder having increased water solubility decreases defects generated due to the insoluble material in the manufacturing process. Furthermore, the binder may be dispersed evenly, thereby improving the adhesive force of an anode active material and cyclic cycle life performance of a lithium battery.

In contrast, the absence of the hydrophilic binding site may decrease the water solubility thereby producing an insoluble material in an aqueous solution. Consequently, the slurry will degrade, resulting in a lithium battery with poor reliability. The insoluble material generated cannot be detected using a conventional analysis method of a carboxymethyl cellulose-based compound. The conventional analysis method may include measuring the amount of moisture, viscosity, the degree of etherification, or the average degree of polymerization. The degree of etherification is only a quantified value to determine which group among hydroxyl groups at positions 3, 4 and 6 is substituted with a carboxymethyl group. Therefore, the solubility of the carboxymethyl cellulose-based binder cannot be predicted only using the degree of etherification.

The carboxymethyl cellulose-based binder according to the present invention may have substituted and unsubstituted glucose units. In a specific embodiment, the carboxymethyl cellulose-based binder may have less than 12% of unsubstituted glucose units. Moreover, the carboxymethyl cellulose-base binder may have glucose units substituted with a carboxymethyl group following hydrolysis. If the amount of the unsubstituted glucose units of the carboxymethyl cellulose-based binder exceeds 12%, then the water solubility of the binder decreases, and thereby fails to achieve the desired effects.

In the present invention, an anode active material may be a graphitic material, such as natural graphite, artificial graphite, coke, carbon fiber; an element selected from Al, Si, Sn, Ag, Bi, Mg, Zn, In, Ge, Pb, Ti, and the like, which may be an alloy with Li; a compound containing at least one element selected from Al, Si, Sn, Ag, Bi, Mg, Zn, In, Ge, Pb, Ti, and the like which may be an alloy with Li; a composite compound composed of an element selected from the group consisting of Al, Si, Sn, Ag, Bi, Mg, Zn, In, Ge, Pb, and Ti, a compound containing at least one element selected from the group consisting of Al, Si, Sn, Ag, Bi, Mg, Zn, In, Ge, Pb, and Ti, carbon, and the graphite material; or a lithium-containing nitride.

An aqueous lithium battery anode current collector of the present invention may be made of any electric conductor that is a chemically non-reactive in a battery. For example, the current collector may be made of stainless steel, Ni, Cu, Ti, or C. The surface of the stainless steel may be adhered with C, Ni, Ti or Ag. In particular, the anode current collector may be composed of Cu or a Cu alloy, and in particular, Cu.

A synthesized rubber-based binder may include compounds such as styrene butadiene rubber, nitrile butadiene rubber, methyl methacrylate butadiene rubber, chloroprene rubber, and carboxylated styrene butadiene rubber, and a latex of these.

The amount of the carboxymethyl cellulose-based binder may be in the range of about 0.1 to about 4.0% by weight of the total anode composition. In this case, the total anode composition may include the anode active material, the synthesized rubber binder, and the carboxymethyl cellulose-based binder.

Hereinafter, a method of manufacturing a lithium battery according to an embodiment of the present invention will be described.

A cathode plate may be manufactured according to a conventional lithium battery manufacturing method. First, a cathode coating material containing an active material and a binder dissolved in a solvent is prepared. The cathode coating material may further contain a plasticizer or a conductor. The cathode coating material may be cast onto aluminium foil and then dried to form a cathode plate. The cathode active material may be at a compound such as lithium composite oxide, single substance sulfur, catholite in which $Li_2S_n$ where $n \geq 1$ is dissolved, organosulfur, and $(C_2S_x)_y$ where $2.5 \leq x \leq 20$ and $y \geq 2$, for example.

The lithium salt included in an electrolytic solution according to the present invention may be composed of any lithium compound that dissolves in an organic solvent to produce lithium ions. The lithium compound may be at least one ionic lithium salt such as lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), and lithium bis(trifluoromethanesulfonyl)amide ($LiN(CF_3SO_2)_2$), for example. A concentration of the lithium salt may be in the range of about 0.5 M to about 2.0 M. If the concentration of the lithium salt is outside of this range, the ionic conductivity may be undesirably low. An organic electrolytic solution containing such an inorganic salt may function as a path through which lithium ions flow in a current flowing direction.

The organic solvent for an electrolytic solution suitable for the present invention may be a compound, such as polyglymes, oxolanes, carbonates, 2-fluorobenzene, 3-fluorobenzene, 4-fluorobenzene, dimethoxyethane, and diethoxyethane, for example. In a particular embodiment, the polyglymes may be a compound including, but not limited to, diethyleneglycol dimethylether($CH_3(OCH_2CH_2)_2OCH_3$), diethyleneglycol diethylether($C_2H_5(OCH_2CH_2)_2OC_2H_5$), triethyleneglycol dimethylether ($CH_3(OCH_2CH_2)_3OCH_3$), and triethyleneglycol diethylether($C_2H_5(OCH_2CH_2)_3OC_2H_5$). In a further embodiment, the dioxolanes may be a compound such as 1,3-dioxolane, 4,5-diethyl-dioxolane, 4,5-dimethyl-dioxolane, 4-methyl-1,3-dioxolane, and 4-ethyl-1,3-dioxolane, for example. In an additional embodiment, the carbonates may be a compound that includes, but is not limited to, methylene carbonate, ethylene carbonate, diethyl carbonate, dimethyl carbonate, γ-butyrolactone, propylene carbonate, dimethyl carbonate, methylethyl carbonate, diethyl carbonate, and vinylene carbonate.

The organic solvent according to an embodiment of the present invention may be a mixture of, for example, ethylene carbonate (EC), ethylmethyl carbonate (EMC), propylene carbonate (PC), and fluorobenzene (FB); and a mixture of diglyme (DGM) (also known as "diethyleneglycol dimethylether"), dimethoxyethane (DME), and 1,3-dioxolane (DOX). In particular, the amount of the solvent used may be the same as that of a solvent used in a conventional lithium battery.

The electrolytic solution according to an embodiment of the present invention may be useful when manufacturing lithium batteries using a conventional manufacturing method, for example:

(1) A method including injecting the electrolytic solution into a capsulated electrode assembly, which includes an anode, a cathode and a separator;

(2) A method including coating electrodes or a separator with a polymer electrolyte containing a matrix forming resin and the electrolytic solution; forming an electrode assembly using the electrodes or separator coated; and sealing the electrode assembly in a battery case; or (3) A method including coating electrodes or a separator with a polymer electrolyte forming composition containing a matrix forming resin and the electrolytic solution; forming an electrode assembly using the electrodes or separator coated; sealing the electrode assembly in a battery case; and polymerizing the inside of the battery. In this case, the method may be applied when the matrix forming resin is a prepolymer or a polymerization monomer.

The separator may be composed of any separator commonly used in lithium batteries. The separator may be less resistant to the migration of ions in the electrolyte, and have a high electrolyte-retaining capacity. For example, the separator may be composed of a glass fiber, polyester, TEFLON, polyethylene, polypropylene, polytetrafluoroethylene (PTFE) or a combination of these materials, which may be in non-woven or woven fabric form. Specifically, the separator may be composed of a polyethylene and/or polypropylene multi-porous membrane, which is less reactive to an organic solvent and guarantees safety.

The matrix forming polymer resin may be composed of any material commonly used as a binder of an electrode plate. For example, the matrix forming polymer resin may be composed of vinylidenefluoride/hexafluoropropylene copolymer, polyvinylidenefluoride, polyacrylonitrile, polymethylmethacrylate, and any combination of these materials thereof.

The matrix forming polymer resin may further include a filler to enhance the mechanical strength of the polymer electrolyte. The filler may be composed of, for example, silica, kaoline, and alumina. In addition, the matrix forming polymer resin may further include a plasticizer if needed.

The electrolytic solution according to the present invention may be used in common lithium batteries, such as primary batteries, secondary batteries, and sulfur batteries. The electrolytic solution according to the present invention may be used in cylindrical and rectangular lithium batteries, but is not limited thereto.

The present invention will be described in greater detail with reference to the following examples. These examples are for illustrative purpose only and are not intended to limit the scope of the invention.

EXAMPLES

Specific Example 1

The following example provides a method for manufacturing a lithium battery of the present invention. 96% by weight of $LiCoO_2$, 2% by weight of polyvinylidenefluoride (PVDF) as a binder, and 2% by weight of a carbon conductor were mixed. The carbon conductor may enhance the mobility of electrons. The mixture was place in a plastic bottle with N-methylpyrrolidone(NMP) and ceramic balls, and then mixed for about 10 hours. The resultant mixture was cast onto a 15 μm-thick aluminum foil using 250 μm-spaced doctor blade, placed in an oven at about 110 μm, and then dried for about 12 hours to completely ablate the NMP. The resultant product was roll-pressed, and cut to a predetermined size to obtain a cathode plate having a thickness of 95 μm.

Each of 97% by weight of graphite powder, 1.5% by weight of styrene butadiene rubber (SBR) as a binder and 1.5% by weight of carboxymethyl cellulose sodium salt were weighed. First, a carboxymethyl cellulose sodium salt was dissolved in distilled water while stirring, to prepare a 1% (by weight) carboxymethyl cellulose sodium salt solution. It was possible to detect the insoluble material with naked eyes within the 1% (by weight) carboxymethyl cellulose sodium salt solution. Then, the graphite powder and styrene butadiene rubber (SBR) weighed above were added to 1% (by weight) of carboxymethyl cellulose sodium salt solution, and mixed. Distilled water and ceramic balls were added thereto, placed in a plastic bottle, and mixed for 10 hours. The mixture was cast onto a 12 μm-thick copper foil using a 300 μm-spaced doctor blade, dried in an oven at about 90° C. for 10 hours, roll-pressed, and cut to a predetermined size to manufacture an anode plate having a thickness of 120 μm.

A 20 μm-thick polyethylene/polypropylene multi-porous membrane (available from Hoechst Cellanese, U.S.A.) was used as a separator. The porous membrane was interposed between the cathode plate and the anode plate and wound into a jelly-roll electrode assembly. The electrode assembly was placed in a cylindrical aluminum battery case, followed by injection of a non-aqueous electrolytic solution and sealed to form a 2200-mAh lithium secondary battery.

The non-aqueous electrolytic solution contained 5.3 g of an organic solvent mixture of ethylene carbonate (EC), ethyl methyl carbonate (EMC), propylene carbonate (PC), and fluorobenzene (FB) in a ratio of 30:55:5:10 by volume dissolving 1.1 M $LiPF_6$. The carboxymethyl cellulose sodium salts contained in the anode were prepared according to the Examples 2-5, supra.

Specific Example 2

A carboxymethyl cellulose sodium salt was used as a binder. In this example, the carboxymethyl cellulose sodium salt has 11.3% of unsubstituted glucose units following hydrolysis. The carboxymethyl cellulose sodium salt was hydrolyzed according to the following process and the concentration of glucose was measured by chromatography.

Carboxymethyl cellulose sodium salt, in an amount of 0.1 g, was added into 2 ml of perchloric acid (70%) and then dispersed for 10 minutes. Then, 18 ml of distilled water was added thereto, and then refluxed for 16 hours. After the reaction was completed, the resultant solution was cooled in an ice bath. Then, the cooled solution was neutralized using 2 M KOH. When the neutralized solution became a neutral or a weak alkali, which was identified using a pH paper, $KClO_4$, which was crystallized after a one-hour ice bath, was removed using a filter. Distilled water was added thereto until the volume of the solution was 50 ml, and evaporated under a vacuum condition until the final volume of the solution reached 5 ml. The final solution was, in situ, analyzed using chromatography to measure the concentration of glucose.

Specific Example 3

A carboxymethyl cellulose sodium salt resulting in 11.4% of unsubstituted glucose units following hydrolysis was produced. The binder was hydrolyzed in the same manner as in Example 2.

Specific Example 4

A carboxymethyl cellulose sodium salt resulting in 12.6% of unsubstituted glucose units following hydrolysis was produced. The binder was hydrolyzed in the same manner as in Example 2.

Specific Example 5

A carboxymethyl cellulose sodium salt resulting in 14.7% of unsubstituted glucose units following hydrolysis was produced. The binder was hydrolyzed in the same manner as in Example 2.

As in exaples 2-5, 1 g of carboxymethyl cellulose sodium salt was prepared and gradually added to 99 g of distilled water while stirring. At that moment, bubbles were generated. Then, after the bubbles disappeared, the generation of the insoluble material was observed with naked eyes. The results are shown in Table 1.

TABLE 1

| | Concentration of of unsubstituted Glucose units | Amount of Insoluble material |
|---|---|---|
| Example 2 | 11.3% | insignificant |
| Example 3 | 11.4% | insignificant |
| Example 4 | 12.6% | noticeable |
| Example 5 | 14.7% | significant |

Referring to Table 1, the water solubility of the carboxymethyl cellulose sodium salts according to Examples 2 and 3 was higher than that of carboxymethyl cellulose sodium salts according to Examples 4 and 5. Therefore, it was easily expected that the anodes containing the carboxymethyl cellulose sodium salts according to Examples 2 and 3 as the binder and lithium batteries containing the anodes exhibit high performance.

Figure 1:
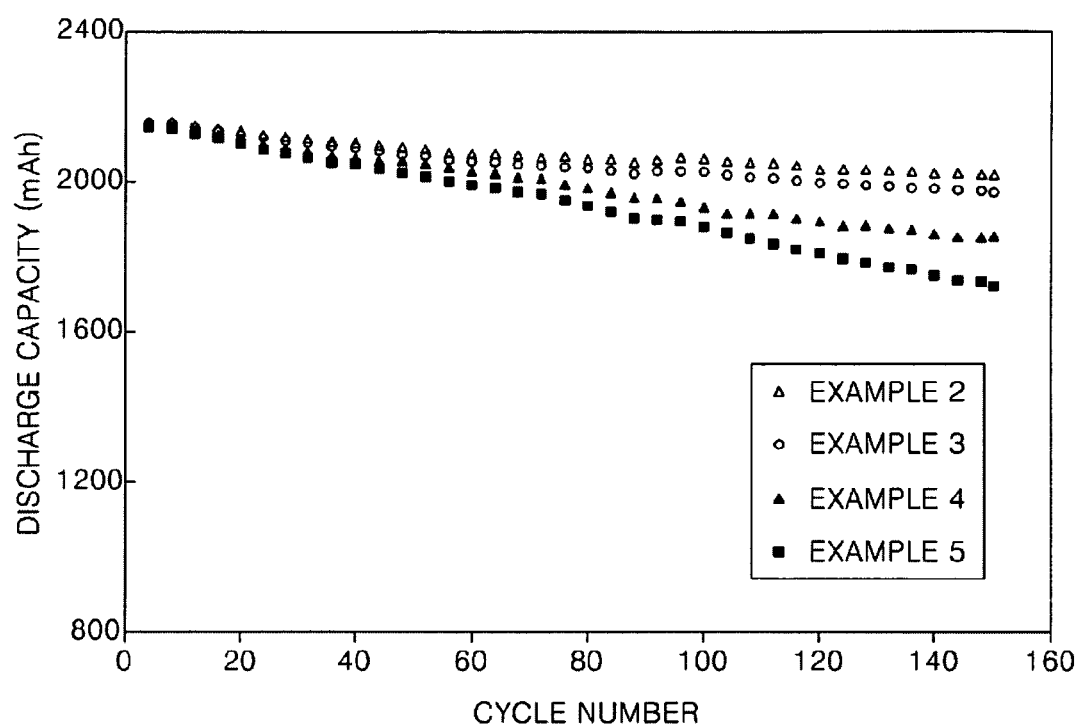
FIG. 1 illustrates the life cycle characteristics of lithium secondary batteries using binders exemplified in Examples 2-5.

FIG. 1 is a graph illustrating charge/discharge life cycle characteristics of secondary lithium batteries, which has as the binder and cellulose sodium salts according to Examples 1-5, infra. FIG. 1 illustrates a change in discharge capacity during 150 cycles when a cylindrical lithium battery with a standard capacity of 2200 mAh was repeatedly charged at 0.5C rate and discharged at 1C rate. The secondary lithium batteries according to Examples 2 and 3 maintained their discharge capacities at 1970 mAh or greater after 150 cycles. Therefore, it was confirmed that the secondary lithium batteries according to Examples 2 and 3 exhibited better discharge capacity maintenance rate, i.e., better life cycle performance than those according to Examples 4 and 5.

The results obtained from FIG. 1 are shown in Table 2. That is, Table 2 shows the discharge capacities and the ratios (%) of discharge capacity to standard capacity after 150 cycles when lithium batteries with standard capacity of 2200 mAh according to Examples 2-5 were repeatedly charged at 0.5C rate and discharged at 1C rate.

TABLE 2

|  | Discharge capacity after 150 cycles | Discharge capacity after 150 cycles (%) |
| --- | --- | --- |
| Example 2 | 2016 mAh | 91.6% |
| Example 3 | 1970 mAh | 89.5% |
| Example 4 | 1851 mAh | 84.2% |
| Example 5 | 1719 mAh | 78.1% |

Referring to Table 2, the discharge capacities (%) of the lithium batteries according to Examples 2 and 3 after 150 cycles were equal to or greater than 89%, and the discharge capacities (%) of the lithium batteries according to Examples 4 and 5 were 84.2% and 78.1%, respectively. Therefore, it was confirmed that the lithium batteries according to Examples 2 and 3 exhibited excellent life cycle performance, compared to those according to Examples 4 and 5.

The present invention provides a carboxymethyl cellulose-based binder with high water solubility. An anode slurry prepared using the binder exhibits high dispersibility. At that moment, electrode materials do not amalgamate together. Further, when an anode is manufactured using the anode slurry, the anode exhibits high uniformity and excellent adhesive force. A lithium-ion secondary battery manufactured using the anode has, e.g., improved life cycle performance. In general, the life cycle performance is mainly determined by uniformity and adhesive force of electrodes. In particular, in the present invention, a bio-unfriendly organic solvent that is used in a conventional lithium battery manufacturing process is replaced with bio-friendly water. Therefore, the solvent used can be easily accessible, and environmental pollution may be prevented.

Therefore, a lithium battery manufactured according to the present invention can be widely used as a power source for portable electronic devices, such as mobile phones, PDAs and notebook computers, as well as general electric devices. In addition, the use of the lithium battery provides safety and guarantees long use of devices.

What is claimed is:

1. A lithium battery anode, comprising:
    an anode active material;
    a synthesized rubber-based binder; and
    a carboxymethyl cellulose-based binder comprising substituted and unsubstituted glucose units wherein less than 12% of the glucose units are not substituted with a carboxymethyl group after being hydrolyzed into glucose units.

2. The lithium battery anode of claim 1, wherein the amount of the carboxymethyl cellulose-based binder is in the range of about 0.1% to about 4.0% of an anode composition.

3. The lithium battery anode of claim 1, wherein the carboxymethyl cellulose-based binder is substituted with a Na salt or a $NH_4$ salt.

4. A lithium battery containing the lithium battery anode, comprising:
    an anode active material;
    a synthesized rubber-based binder; and
    a carboxymethyl cellulose-based binder comprising substituted and unsubstituted glucose units wherein less than 12% of the glucose units are not substituted with a carboxymethyl group after being hydrolyzed into glucose units.

* * * * *